US011681321B2

(12) United States Patent
Huang et al.

(10) Patent No.: US 11,681,321 B2
(45) Date of Patent: *Jun. 20, 2023

(54) IMAGE IDENTIFICATION METHOD APPLIED TO A JOYSTICK

(71) Applicant: PixArt Imaging Inc., Hsin-Chu (TW)

(72) Inventors: Chao-Chien Huang, Hsin-Chu (TW); Yen-Hung Wang, Hsin-Chu (TW); Yi-Chung Chen, Hsin-Chu (TW); Hui-Hsuan Chen, Hsin-Chu (TW); Yi-Hsien Ko, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 38 days.

This patent is subject to a terminal disclaimer.

(21) Appl. No.: 17/521,883

(22) Filed: Nov. 9, 2021

(65) Prior Publication Data

US 2022/0066497 A1 Mar. 3, 2022

Related U.S. Application Data

(63) Continuation of application No. 17/069,824, filed on Oct. 13, 2020, now Pat. No. 11,204,618.

(60) Provisional application No. 62/940,911, filed on Nov. 27, 2019.

(51) Int. Cl.
*G06F 3/033* (2013.01)
*G05G 9/047* (2006.01)

(52) U.S. Cl.
CPC ... *G05G 9/047* (2013.01); *G05G 2009/04759* (2013.01)

(58) Field of Classification Search
CPC ......... G05G 9/047; G05G 2009/04759; G05G 2009/04707; G05G 2009/04711; A63F 13/24; A63F 13/213
USPC ............................ 345/159, 161, 179; 463/31
See application file for complete search history.

(56) References Cited

U.S. PATENT DOCUMENTS 5,491,462 A * 2/1996 Cecchi .................... A63F 13/24 74/471 XY
6,244,959 B1 * 6/2001 Miyamoto ............ A63F 13/822 463/31
11,544,883 B1 * 1/2023 Charlton ............... A63F 13/213
2014/0256443 A1 * 9/2014 Joynes .................. A63F 13/327 463/37
2016/0077543 A1 * 3/2016 Conro .................... G05G 9/047 74/471 XY
2017/0319959 A1 * 11/2017 Lavache .............. H04N 23/683
2020/0012311 A1 * 1/2020 Li ........................... A63F 13/24
(Continued)

*Primary Examiner* — Thuy N Pardo
(74) *Attorney, Agent, or Firm* — Winston Hsu

(57) ABSTRACT

An image identification method is used to eliminate accumulated error of operation of a joystick. The joystick has an optical sensor adapted to analyze a movement of a plurality of identification dots disposed on a stick body. The image identification method includes receiving a series of detection images, setting a first identification dot of the plurality of identification dots as being a reference identification dot, and setting a second identification dot of the plurality of identification dos as being the reference identification dot and cancelling the first identification dot as being the reference identification dot when the first identification dot is near a border of the detection image. A position change of the reference identification dot in the series of detection images is used for identifying a control status of the joystick.

5 Claims, 6 Drawing Sheets

(56) References Cited

U.S. PATENT DOCUMENTS

| | | | | |
|---|---|---|---|---|
| 2020/0117228 | A1* | 4/2020 | Wang | G06F 3/038 |
| 2020/0211508 | A1* | 7/2020 | Clarke | G09G 5/14 |
| 2020/0246690 | A1* | 8/2020 | Weitzman | A63F 13/816 |
| 2021/0146265 | A1* | 5/2021 | Lamm | G06F 3/04815 |
| 2021/0191533 | A1* | 6/2021 | Chen | G05G 9/047 |

* cited by examiner

IMAGE IDENTIFICATION METHOD APPLIED TO A JOYSTICK

CROSS REFERENCE TO RELATED APPLICATIONS

This application is a continuation application of U.S. patent application Ser. No. 17/069,824, filed on 2020 Oct. 13, which claims the benefit of U.S. provisional application No. 62/940,911, filed on 2019 Nov. 27. The disclosures of the prior applications are incorporated herein by reference herein in their entirety.

BACKGROUND OF THE INVENTION

1. Field of the Invention

The present invention relates to an image identification method, and more particularly, to an image identification method of eliminating accumulated error of a joystick.

2. Description of the Prior Art

A conventional mechanical joystick includes a sensor, a trackball, a lever arm and a handle. A user presses the handle to move the lever arm, the lever arm can be inclined and rotated via the trackball, and the sensor detects motion of the trackball to control a cursor signal output by the mechanical joystick. The handle is made by solid material and can be pushed and pulled to recline the lever arm for generating the cursor signal. While the mechanical joystick is reclined, the lever arm can be rotated or slanted towards specially designated directions, and the trackball recovers the lever arm via a spring. Therefore, the conventional mechanical joystick is operated by limited gestures due to the designated directions, and may easily result in mechanical fatigue by long-term usage. If the mechanical joystick is designed as a thin joystick, a movable structural component in the thin joystick is easily damaged after a long-term operation, and an accuracy of the thin joystick is decreased.

SUMMARY OF THE INVENTION

The present invention provides an image identification method of eliminating accumulated error of a joystick for solving above drawbacks.

According to the claimed invention, an image identification method is used to eliminate accumulated error of operation of a joystick. The joystick has an optical sensor adapted to analyze a movement of a plurality of identification dots disposed on a stick body. The image identification method includes receiving a series of detection images, setting a first identification dot of the plurality of identification dots as being a reference identification dot, and setting a second identification dot of the plurality of identification dos as being the reference identification dot and cancelling the first identification dot as being the reference identification dot when the first identification dot is near a border of the detection image. A position change of the reference identification dot in the series of detection images is used for identifying a control status of the joystick.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
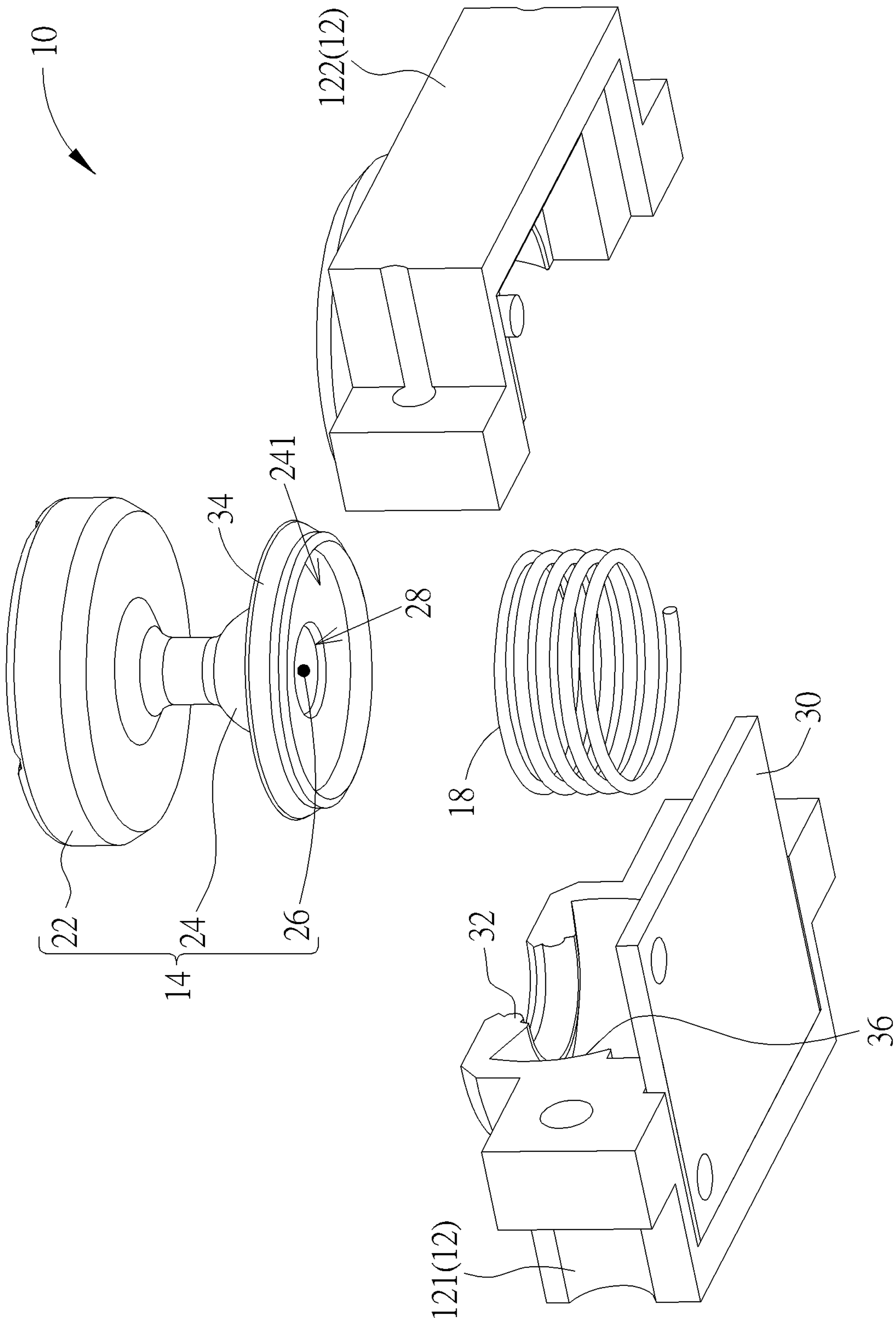
FIG. 1 and FIG. 2 are exploded diagrams of a joystick in different views according to an embodiment of the present invention.
Figure 2:
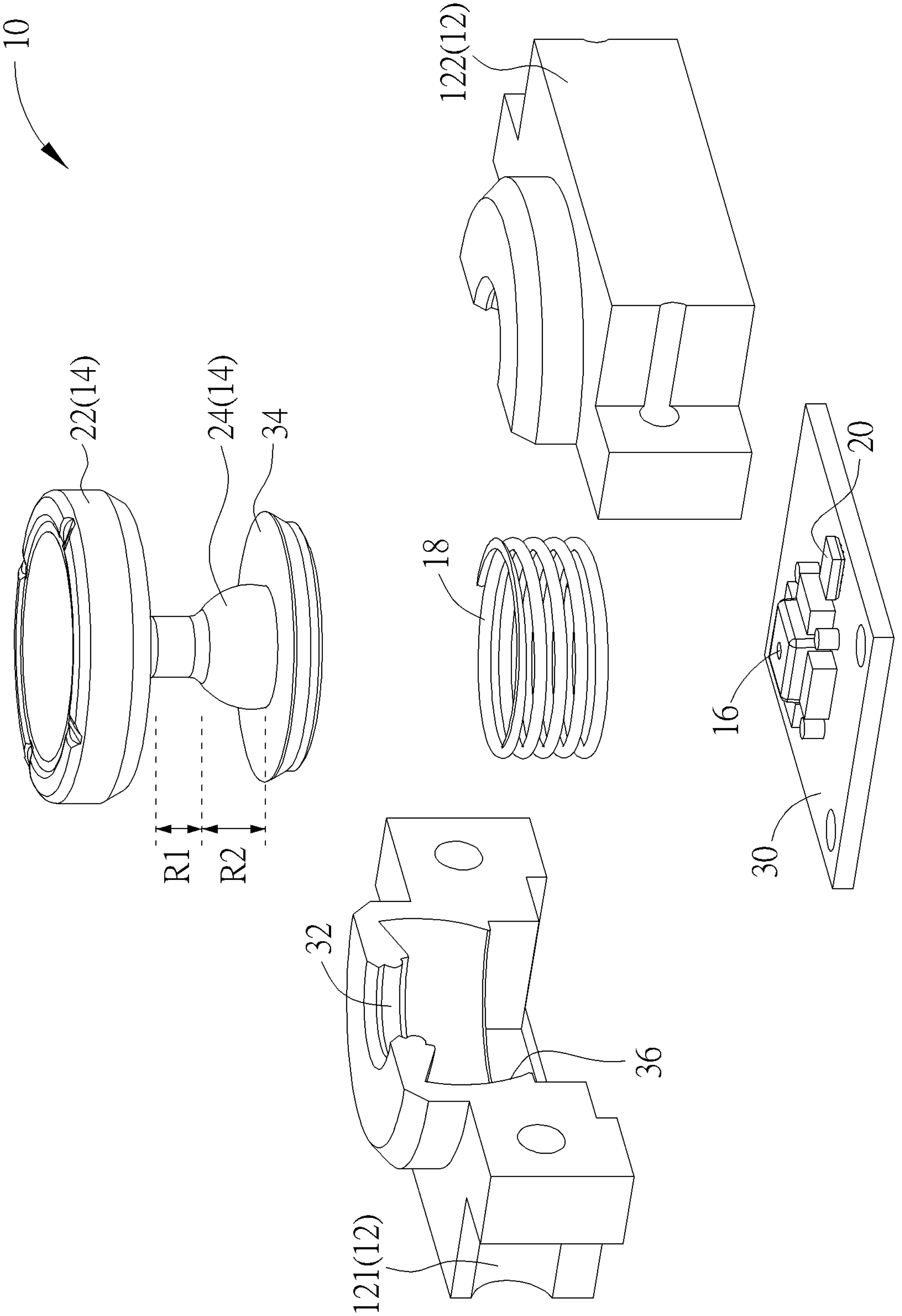
Figure 3:
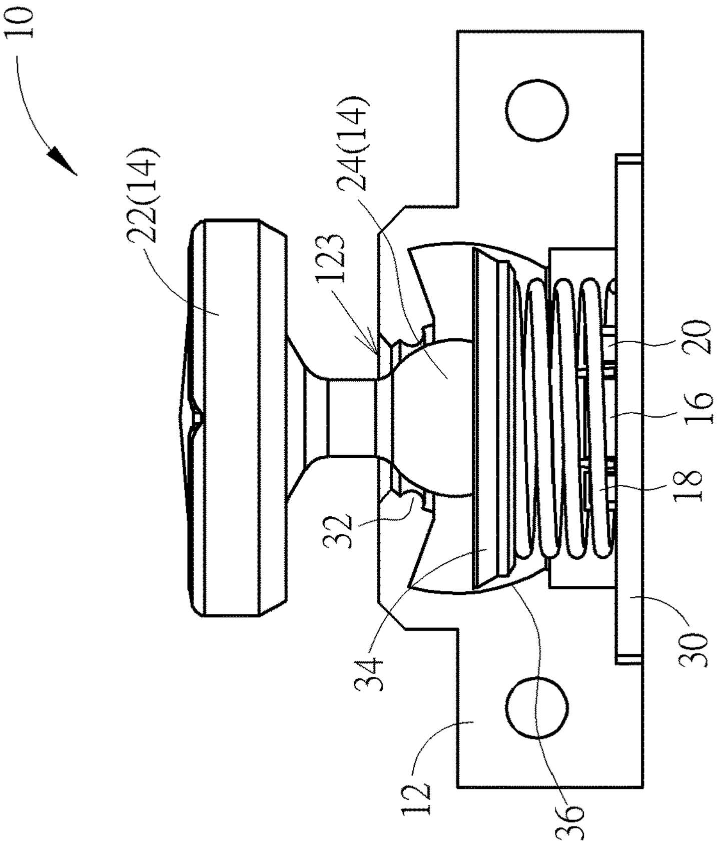
FIG. 3 is an assembly diagram of a part of the joystick according to the embodiment of the present invention.

Please refer to FIG. 1 to FIG. 3. FIG. 1 and FIG. 2 are exploded diagrams of a joystick 10 in different views according to an embodiment of the present invention. FIG. 3 is an assembly diagram of a part of the joystick 10 according to the embodiment of the present invention. The joystick 10 can include a casing 12, a stick body 14, an optical sensor 16, a resilient component 18 and a light source 20. The casing 12 can include a first shell 121 and a second shell 122 assembled with each other, which depends on a design demand. The casing 12 can have a hole 123. The stick body 14 can pass through the hole 123 and disposed on the casing 12 in a movable manner. The stick body 14 can include a pressing portion 22, an indication portion 24 and an identification pattern 26. The pressing portion 22 can be located out of the casing 12, and be an operation interface for being pressed. The indication portion 24 can be connected to the pressing portion 22 and stretch into the hole 123. The identification pattern 26 can be disposed on an inner surface of a sunken structure 28, and the sunken structure 28 is disposed on a bottom 241 of the indication portion 24.

As shown in FIG. 1, two opposite ends of the resilient component 18 can respectively abut against a circuit board 30 inside the casing 12 and the bottom 241 of the indication portion 24. The sunken structure 28 can be formed on the bottom 241, and further stretched toward a direction opposite to the circuit board 30; that is to say, the bottom 241 of the indication portion 24 can be partly hollowed out to be set as the sunken structure 28.

The optical sensor 16 can be disposed on the circuit board 30 inside the casing 12, and faces toward the sunken structure 28. The light source 20 can be disposed on the circuit board 30, and adjacent to the optical sensor 16 for emitting an optical illumination signal toward the identification pattern 26 inside the sunken structure 28. The light source 20 is an optional element in the present invention. The optical sensor 16 can acquire an image of the identification pattern 26. The captured image of the identification pattern 26 can be analyzed by the optical sensor 16 directly or the raw data of the captured image could be sent to an operation processor (not shown in the figures) electrically connected to the optical sensor 16 for the image analyzation. When the image about the identification pattern 26 is analyzed, the joystick 10 can determine a movement of the identification pattern 26, so as to estimate a moving direction and/or a moving rotation of the indication portion 24, and to identify a control status of the stick body 14.

The resilient component 18 can be disposed between the indication portion 24 and the bottom (such as the circuit board 30) of the casing 12. As an external force is applied to the stick body 14 for operating the joystick 10, the indication portion 24 can be shifted or rotated according to motion of the stick body 14, and the resilient component 18 is compressed to store a resilient recovering force. As the external force applied to the stick body 14 is removed, the resilient recovering force of the resilient component 18 can recover the stick body 14 to an initial position; for example, the pressing portion 22 may be moved back to a center of the casing 12. Generally, the indication portion 24 can be disposed inside the casing 12 in a detachable manner, so that the resilient component 18 can push the indication portion 24 from down to up, for abutting the indication portion 24 against an upper surface inside the casing 12.

Figure 4:
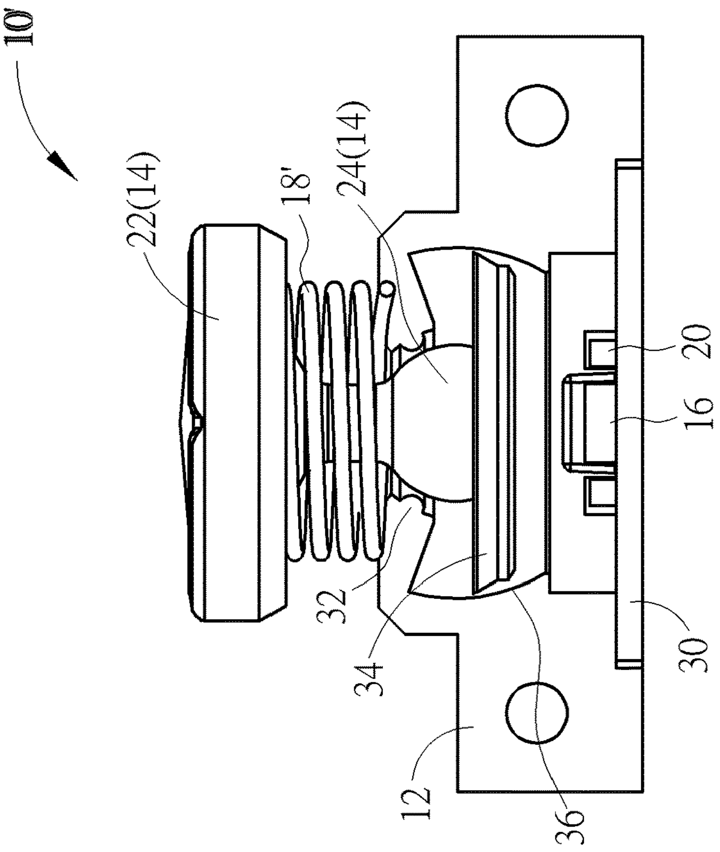
FIG. 4 is an assembly diagram of the joystick according to another embodiment of the present invention.

Please refer to FIG. 4. FIG. 4 is an assembly diagram of the joystick 10' according to another embodiment of the present invention. In the embodiment, elements having the same numerals as ones of the foresaid embodiment have the same structures and functions, and a detailed description is omitted herein for simplicity. The joystick 10' can fix two opposite ends of the resilient component 18' respectively on a bottom of the pressing portion 22 and an outer surface of the casing 12, which means the resilient component 18' is located outside the casing 12. The resilient recovering force of the resilient component 18' can push the pressing portion 22 back to the initial position in response to a removal of the external force applied to the stick body 14.

As shown in FIG. 1 to FIG. 3, the indication portion 24 can be a half-spherical member, which can be disposed inside the casing 12 in a shiftable and rotatable manner. The indication portion 24 can be divided into a first section R1 and a second section R2 connected to each other. A dimension of the first section R1 preferably can be smaller than a dimension of the hole 123, and a dimension of the second section R2 preferably can be greater than the dimension of the hole 123. Thus, the indication portion 24 can partly stretch out of the casing 12 to connect with the pressing portion 22, and the stick body 14 can be movably assembled with the casing 12. The stick body 14 can be constrained by the hole 123, to prevent the stick body 14 and the casing 12 from separation. Besides, the casing 12 further can include a blocking portion 32 disposed on a bore wall of the hole 123, and used to stop the indication portion 24 to avoid the stick body 14 from being disassembled from the hole 123.

It should be mentioned that the blocking portion 32 further can be used to constrain a rotation angle of the stick body 14 relative to the casing 12. For example, if the casing 12 does not dispose the blocking portion 32 on the bore wall of the hole 123, the hole 123 has the larger dimension, and the stick body 14 can be swayed or rotated relative to the casing 12 widely; if the blocking portion 32 is disposed on the bore wall of the hole 123, a swaying range or a rotating range of the stick body 14 relative to the casing 12 can be reduced accordingly. Structural dimensions (such as a depth and a width) of the blocking portion 32 are not limited to the embodiment shown in the figures, and depend on the design demand.

In addition, the indication portion 24 further can include a supporting member 34 surrounding an edge of the indication portion 24, and the casing further can include a constraining portion 36 disposed on the inner surface of the casing 12. A dimension of the supporting member 34 preferably can be greater than the dimensions of the first section R1 and the second section R2. The supporting member 34 can abut against the inner surface of the casing 12 in a detachable manner, and can be moved relative to the inner surface of the casing 12 in accordance with the external force applied to the pressing portion 22. The supporting member 34 stops moving when abutting against the constraining portion 36. The constraining portion 36 can constrain a movement of the supporting member 34 relative to the casing 12.

Figure 5:
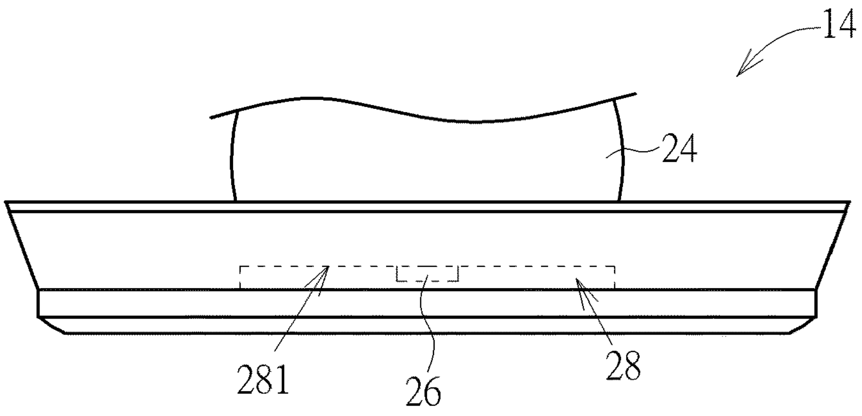
FIG. 5 to FIG. 7 are diagrams of a stick body according to different embodiments of the present invention.
Figure 6:
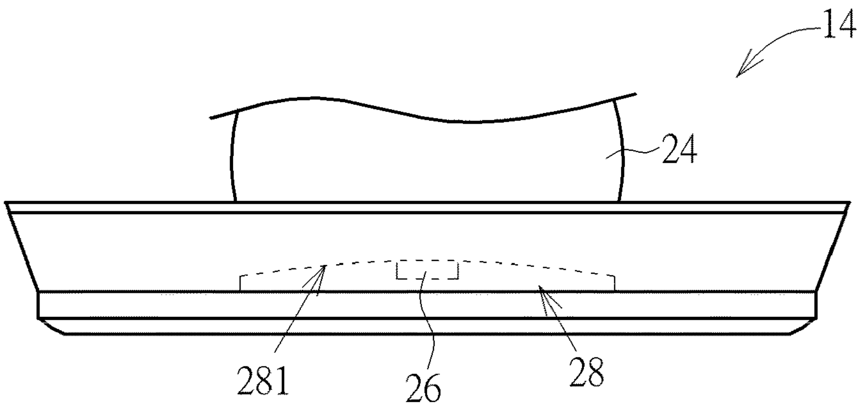
Figure 7:
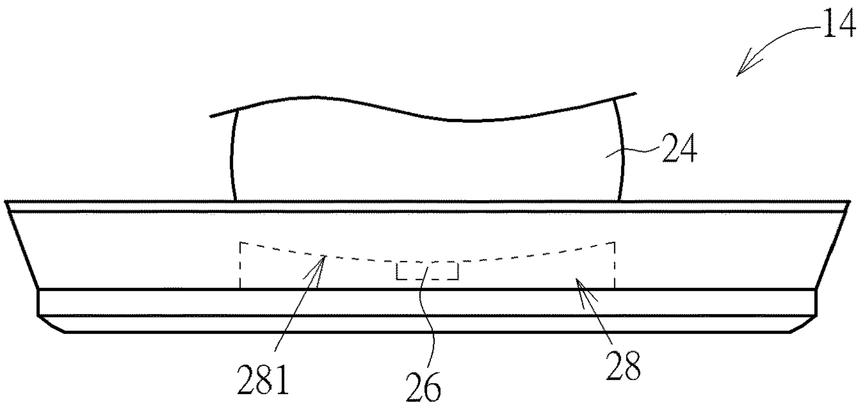

Please refer to FIG. 5 to FIG. 7. FIG. 5 to FIG. 7 are diagrams of the stick body 14 according to different embodiments of the present invention. The stick body 14 can form the sunken structure 28 on the bottom of the indication portion 24, and the identification pattern 26 can be disposed on the inner surface 281 of the sunken structure 28 to lengthen an optical path between the optical sensor 16 and the identification pattern 26. As the embodiment shown in FIG. 5, the inner surface 281 of the sunken structure 28 can be a flat surface. In other possible embodiments, as the embodiments shown in FIG. 6 and FIG. 7, the inner surface 281 of the sunken structure 28 can be a concave arc surface or a convex arc surface. Forms of the inner surface 281 are not limited to the above-mentioned embodiments, which depends on the design demand.

Figure 8:
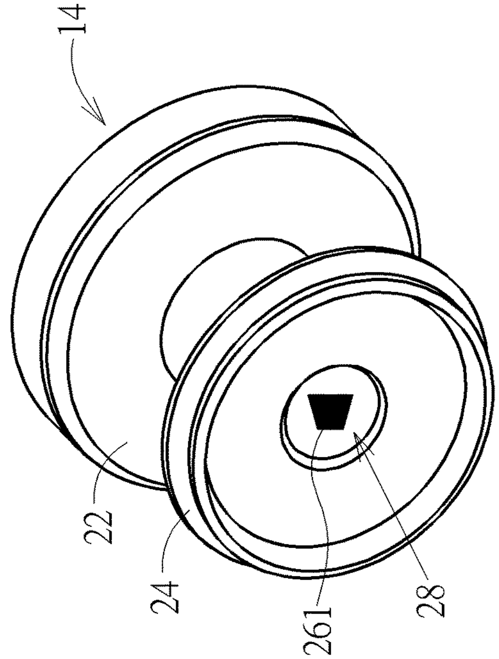
FIG. 8 to FIG. 11 are diagrams of an identification pattern according to different embodiments of the present invention.
Figure 9:
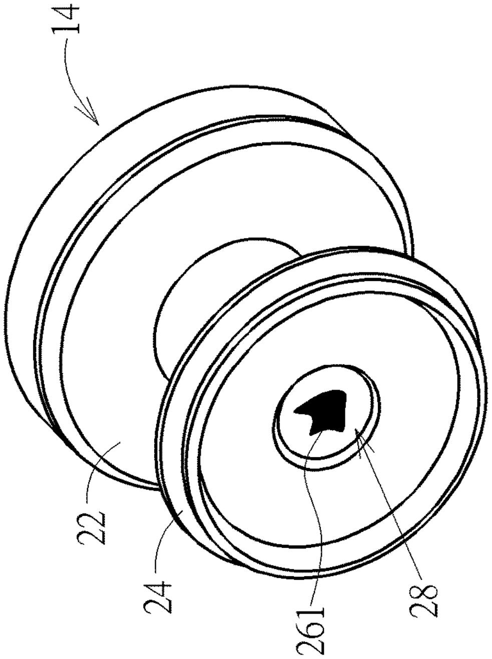
Figure 10:
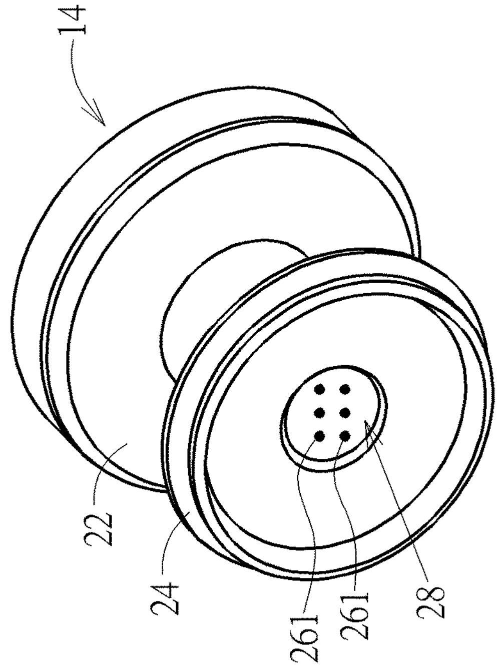
Figure 11:
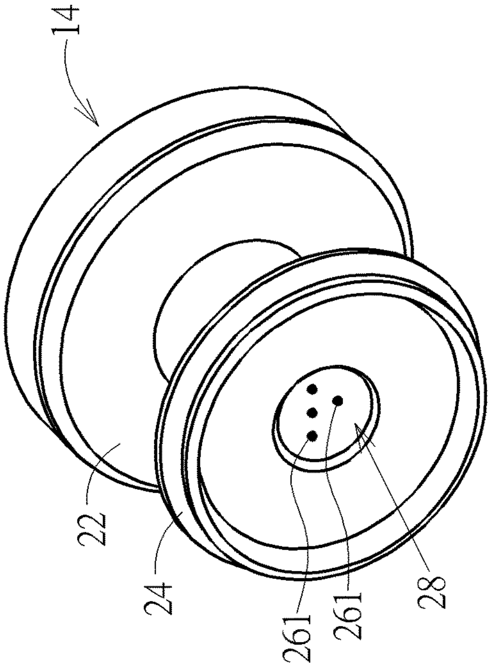

Please refer to FIG. 8 to FIG. 11. FIG. 8 to FIG. 11 are diagrams of the identification pattern 26 according to different embodiments of the present invention. As shown in FIG. 8, the identification pattern 26 can be a single identification dot 261 having a symmetric form, such as a trapezoid, a circle, a square or a triangle. As shown in FIG. 9, the identification pattern 26 can be the single identification dot 261 having an asymmetric form, such as any asymmetric icon or symbol. As shown in FIG. 10, the identification pattern 26 can include a plurality of identification dots 261 arranged in symmetry; or, as shown in FIG. 11, the identification pattern 26 can include the plurality of identification dots 261 arranged in asymmetry. Image analysis algorithm executed by the joystick 10 for analyzing the identification pattern 26 may be coded in accordance with an amount and a shape of the identification dot 261, and not limited to the above-mentioned embodiments. Any amount or any shape of the identification pattern 26 capable of setting the identification pattern 26 within a predefined region within a field of view of the optical sensor 16, to prevent the stick body 14 from leaving the predefined region due to giant motion, can conform to an aim of the present invention.

If the identification pattern 26 has the single identification dot 261, a movement of the single identification dot 261 is limited to the field of view of the optical sensor 16 when the stick body 14 is swayed and/or rotated. And when the identification pattern 26 has the plurality of identification dots 261, the movement range of the identification dots 261 are broaden and even allow some of the identification dots 261 been moved out of the field of view of the optical sensor 16 when the stick body 14 is swayed and/or rotated. For example, the optical sensor 16 may capture a series of detection images; a center can be defined within a first detection image of the series of detection images, and one of the plurality of identification dots 261, which is mostly close to the defined center, within the first detection image can be set as a first identification dot, and the first identification dot can be represented as a reference identification dot between the first detection image and a second detection image of the series of detection images. As the stick body 14 moved, the second detection image of the series of detection images is analyzed to trace a position changed of the first identification dot (which is used as the reference identification dot) between the first detection image and the second detection image and further determining a range and an angle of the movement, sway or rotation of the joystick 10.

In some possible situation, a third detection image of the series of detection images is analyzed to find out that a position of the first identification dot (which is used as the reference identification dot) in the third detection image is near to a border of the detection image but still located inside the field of view of the optical sensor 16; meanwhile, a fourth detection image may be unable to trace the changed position of the first identification dot. Thus, the present invention can redefine a new center within the third detection image, and set one of the plurality of identification dots 261, which is mostly close to the redefined new center, within the third detection image as a second identification dot, and the second identification dot can be represented as a new reference identification dot. When a fourth detection image of the series of detection images is analyzed, positions of the second identification dot (which is used as the reference identification dot) in the third detection image and the forth detection image can be traced to determine the range and the angle of the movement, sway or rotation of the joystick 10.

Moreover, the identification pattern 26 may include several identification dots 261, such as one large identification dot and one small identification dot, and a connection line between the large identification dot and the small identification dot can be stretched to draw an elliptic icon. The optical sensor 16 can detect the elliptic icon containing the identification dots with different sizes to determine the range and the angle of the movement, sway or rotation of the joystick 10. It should be mentioned that if the elliptic icon is in a center of the field of view of the optical sensor 16, other detection conditions may be optionally applied to detect the rotary direction of the joystick 10; if a center of the elliptic icon is not overlapped with the center of the field of view of the optical sensor 16, the optical sensor 16 can accurately determine the range and the angle of the movement, sway or rotation of the joystick 10 without additional detection conditions.

Figure 13:
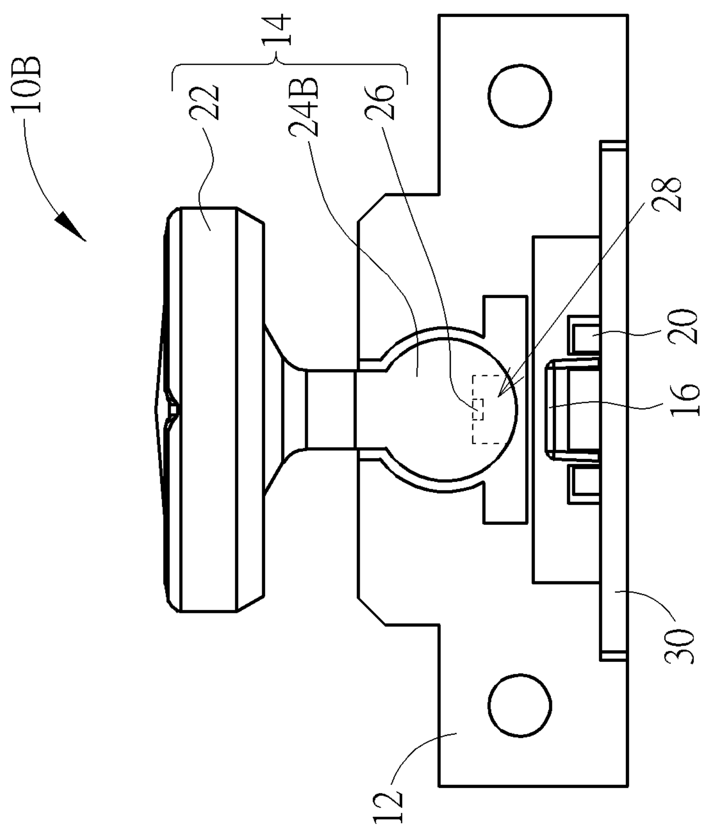
FIG. 13 is an assembly diagram of a part of the joystick according to another embodiment of the present invention.
Figure 12:
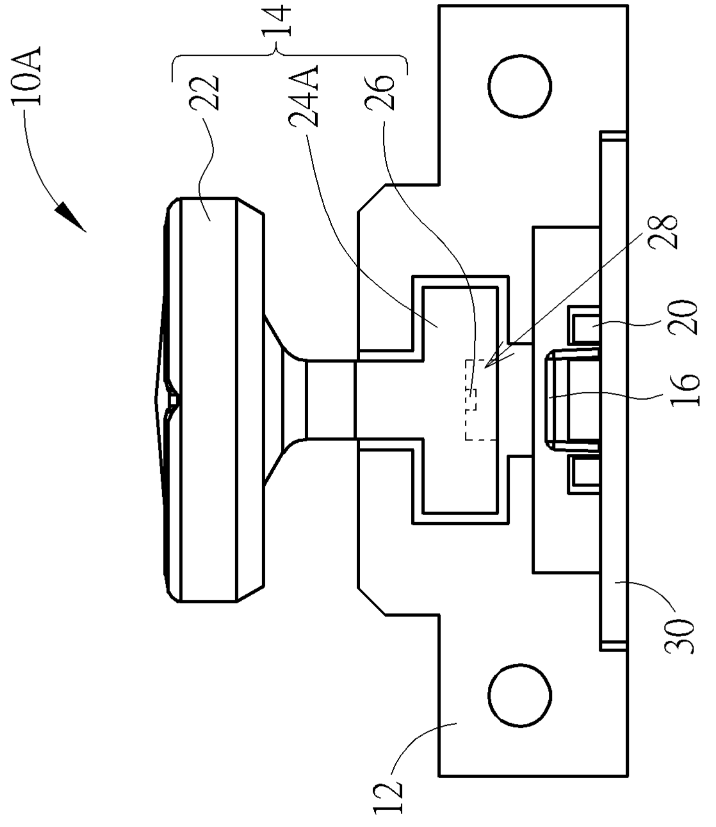
FIG. 12 is an assembly diagram of a part of the joystick according to another embodiment of the present invention.

Please refer to FIG. 12 and FIG. 13. FIG. 12 is an assembly diagram of a part of the joystick 10A according to another embodiment of the present invention. FIG. 13 is an assembly diagram of a part of the joystick 10B according to another embodiment of the present invention. In the embodiments, elements having the same numerals as ones of the foresaid embodiments have the same structures and functions, and a detailed description is omitted herein for simplicity. As shown in FIG. 12, the stick body 14 of the joystick 10A can include the indication portion 24A formed as a cubic member, which can be disposed inside the casing 12 in a movable manner; the joystick 10A can provide preferred pressing operation. As shown in FIG. 13, the stick body 14 of the joystick 10A can include the indication portion 24B formed as a spherical member, and the casing 12 can have an accommodating structure 38; the indication portion 24B can be rotatably disposed inside the casing 12 in a tight fit manner, so that the joystick 10B can provide preferred rotating operation.

In conclusion, the present invention can utilize optical detection technology to detect absolute motion and relative motion of the joystick in near real-time or real-time, to prevent a cursor output by the joystick from unexpected drifting due to mechanical wear or elastic fatigue resulted from frequent operation. The joystick of the present invention can form the sunken structure on the bottom of the indication portion of the stick body, and the identification pattern can be disposed inside the inner surface of the sunken structure to be captured by the optical sensor for analysis; therefore, a structural dimension of the joystick can be minimized and a length of the optical path still can be sufficient for the optical sensor, so the optical sensor can provide preferred identification accuracy. Moreover, design of disposing the identification pattern inside the sunken structure of the indication portion can further avoid the identification pattern from leaving the field of view of the optical sensor due to small motion, so as to provide preferred identification efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image identification method of eliminating accumulated error of a joystick, the joystick having an optical sensor adapted to analyze a movement of a plurality of identification dots disposed on a stick body, the image identification method comprising:

receiving a series of detection images;

setting a first identification dot of the plurality of identification dots as being a reference identification dot, wherein a position change of the reference identification dot in the series of detection images is used for identifying a control status of the joystick; and setting a second identification dot of the plurality of identification dos as being the reference identification dot and cancelling the first identification dot as being the reference identification dot when the first identification dot is near a border of the detection image.

2. The image identification method of claim 1, further comprising:

defining a center of a first detection image of the series of detection images; and selecting one of the plurality of identification dots mostly close to the defined center within the first detection image to be the first identification dot.

3. The image identification method of claim 1, further comprising:

tracing the position changed of the first identification dot between the first detection image and a second detection image of the series of detection images, for identifying the control status of the joystick.

4. The image identification method of claim 1, further comprising:

defining a center within a third detection image in response to the first identification dot near the border of the detection image;

selecting one of the plurality of identification dots mostly close to the defined center within the third detection image to be the second identification dot; and tracing the position changed of the second identification dot between the third detection image and a fourth detection image of the series of detection images, for identifying the control status of the joystick.

5. The image identification method of claim 1, wherein the first identification dot is near the border of the detection image is interpreted as a distance between the first identification dot and the border of the detection image is smaller than a predefined value.

* * * * *